United States Patent [19]
Motzet et al.

[11] Patent Number: 5,435,674
[45] Date of Patent: Jul. 25, 1995

[54] PROCESS FOR MANUFACTURING OF WORKPIECES, ESPECIALLY WORKPIECES OF MOTOR VEHICLE DRIVE ASSEMBLIES, AND ALSO A DEVICE FOR APPLICATION OF THE PROCESS

[75] Inventors: Josef Motzet; Karl Muller, both of Ingolstadt, Germany

[73] Assignee: Audi AG, Germany

[21] Appl. No.: 835,427

[22] PCT Filed: Aug. 4, 1990

[86] PCT No.: PCT/EP90/01282

§ 371 Date: Feb. 25, 1992

§ 102(e) Date: Feb. 25, 1992

[87] PCT Pub. No.: WO91/02623

PCT Pub. Date: Mar. 7, 1991

[30] Foreign Application Priority Data

Aug. 25, 1989 [DE] Germany .......................... 39 28 139.6

[51] Int. Cl.⁶ ................................................. B23C 3/00
[52] U.S. Cl. ................................. 409/131; 408/1 R
[58] Field of Search ................ 29/33 P, 563; 409/131, 409/132, 164, 172, 174; 408/69, 70, 71, 87, 89, 90, 709, 1 R

[56] References Cited

U.S. PATENT DOCUMENTS

| | | | |
|---|---|---|---|
| 2,808,746 | 10/1957 | Blomquist | 408/70 |
| 4,309,600 | 1/1982 | Perry et al. | 29/33 P |
| 4,603,456 | 8/1986 | Hiroyasu et al. | 29/33 P |
| 4,629,384 | 12/1986 | Beshke . | |

FOREIGN PATENT DOCUMENTS

| | | | |
|---|---|---|---|
| 2512722 | 3/1983 | France . | |
| 2627120 | 8/1989 | France . | |
| 3605470 | 2/1986 | Germany . | |
| 55-31530 | 3/1980 | Japan . | |
| 56-82156 | 7/1981 | Japan . | |
| 57-107757 | 7/1982 | Japan . | |
| 60-177839 | 9/1985 | Japan . | |
| 86144 | 5/1986 | Japan | 29/33 P |
| 2004781 | 4/1979 | United Kingdom . | |

Primary Examiner—Daniel W. Howell
Attorney, Agent, or Firm—Lalos & Keegan

[57] ABSTRACT

The invention relates to a process for production of workpieces (1), especially motor vehicle drive assemblies, on a production line, the workpiece (1) having lateral surfaces (3, 11, 12, 18, 21) extending more or less parallel to a longitudinal axis (4) and also frontal areas (7, 8) extending more or less perpendicular to these surfaces and being pivotable and immobilizable in a number of machining positions for the individual machining steps.

For the purpose of machining the lateral surfaces (3, 11, 12, 18, 21) and partial areas (2, 5, 6, 20) of the workpiece (1) accessible from them, the workpiece (1) is moved to the individual production stations with its longitudinal axis (4) vertically directed, at the individual production station is pivoted about the longitudinal axis (4) into the machining position required, and is immobilized and clamped in this position.

Application of the process claimed for the invention is made possible by the fact that the workpiece (1) is outfitted with a special adjusting element (adjusting holes 9 in the outer circumference of a frontal surface 8 and in a circular line with the longitudinal axis 4 as center).

The production process claimed for the invention yields low cost accompanied by maximum production flexibility and is at the same time suitable for high-output mass production (FIG. 1).

2 Claims, 3 Drawing Sheets

PROCESS FOR MANUFACTURING OF WORKPIECES, ESPECIALLY WORKPIECES OF MOTOR VEHICLE DRIVE ASSEMBLIES, AND ALSO A DEVICE FOR APPLICATION OF THE PROCESS

The invention relates to a process for manufacture of workpieces having additional characteristics, and also to a device especially well suited for application of the process.

The report "Flexible Manufacture of Series Produced Diesel Engines" published in VDI-Zeitschrift, Volume 126 (1984), No 9, May, pages 311 et seq. presents a manufacturing process, together with a flexible manufacturing system for machining modifications of a diesel engine used in various vehicle models. The basic plant layout is that of flexible interlinking with crossover and outward transfer stations for palettes carrying workpieces.

Cylinder heads and cylinder blocks of engines are machined by cutting with the workpiece handling and machine system employed. At an upstream clamping station the workpieces are clamped in a preselectable chuck on a workpiece carrier and then taken to individual machining stations. The numeral 9 identifies a machining station that is very flexible from the viewpoint of machining options but very costly from that of design. This machining center has three arbors associated with specific tools, while a fourth arbor is mounted on an indexing table and a fifth arbor in an indexing table swiveling device. All the machining operations involved in the system can be performed alternatively with this five-arbor machining center.

The report stresses as a particular advantage that this layout permits prompt conversion to new component alternatives with relatively low investment cost. This flexibility of machining is achieved by means of machining centers and a flexible conveying system.

On the whole the crossover and outward transfer stations of the factory in question correspond to the bypass lines of other state-of-the art equipment for series production of drive assemblies, which are required if, for example, in-line and V engines are to be manufactured by means of common equipment. It is a question in this instance of manufacturing plants in which either in-line-specific or to V-specific production areas extend over the bypass lines, so that only a very few component areas extend over the common production equipment itself. The machining-specific differences in parts family members are generally reconciled by the different and specifically adapted arrangement of the production stations on the bypass lines or outward transfer stations. Consequently, a large number of bypass lines or machining stations and for the most part costly machine arrangements at the machining stations are generally required. The drive assemblies, resting on one of their sides, that is, with their horizontal axis extending horizontally, are delivered to these stations.

Although the manufacturing plant described in the foregoing does provide the possibility of widening the range of models to be manufactured, it involves loss of its transfer line nature. That is to say, this plant is not suited for high output mass production geared for manufacture of a large number of pieces, as is customary on transfer lines, because high investment costs and a large amount of space are required, so that the cost effectiveness is lowered.

In the case of the last mentioned production equipment, that is, transfer lines, such as are described in FR-A 26 27 120, for example, not every workpiece has a workpiece carrier of its own assigned to it. These workpieces rather rest directly on a conveying system (chain conveyors, roller conveyors, or the like) and are not immobilized and clamped until they reach the individual machining stations. The production equipment is assigned or subordinated to the workpiece. The adapted layout of the production equipment is necessarily determined on the basis of a uniform workpiece clamping position. The result often is that a costly position oblique to the machine bed must be selected.

FR-A 26 27 120 describes the manufacture of a vehicle drive assembly that has lateral surfaces extending more or less parallel to a longitudinal axis and frontal surfaces more or less perpendicular to this axis and, while standing on a lateral surface, that is, with its longitudinal axis horizontal, is advanced to the individual machining stations. Suitable means are applied at the stations to pivot the assembly so that it rests on its lateral surface.

With the production system described in the foregoing taken as a basis, it is the object of the invention to develop a process for manufacture of workpieces, especially ones of motor vehicle drive assemblies, a process that permits maximum manufacturing flexibility accompanied by low cost, and at the same time is suitable for high output mass production.

A further object of this invention is to provide an improved means for manufacturing workpieces.

SUMMARY OF THE INVENTION

In the manufacturing process claimed for the invention, all component areas of the manufacturing equipment are constantly in use, specifically in a normal position set at an angle of 90° to the center units, so that the processing operations may always be carded out in this position, independently of whether, for example, in-line or V engines or similar parts are to be processed. This is due to an essential feature of the invention, that is, the special position of the workpiece with longitudinal axis extending vertically and slewability about this longitudinal axis, so that the greater part by far of the machining processes may be carded out.

It is known from DE-A 37 21 160 that a cylinder block can be clamped on one of its end surfaces for the purpose of carrying out a special machining process on the block. However, no suggestions were to be derived from this state of the art for the manufacturing process claimed for the invention as now proposed that might indicate a workpiece alignment such as this for virtually the entire manufacturing process. The alignment and drilling device described in the published patent application provides for vertical feed motion of the boring mill for the purpose of engaging the front of the engine block to drill in succession in a number of transverse partitions or sections of the latter holes for reception of crankshaft bearings. The tool advances parallel to the longitudinal axis of the engine.

In the manufacturing process of the invention, on the other hand, with the workpiece in this position the tool is fed or advanced horizontally. Nor are the faces of the workpiece machined; all necessary operations are rather performed on all lateral surfaces.

An essential criterion of the manufacturing process of the invention is that a workpiece is absolutely subordinate to a particular machine as base, without the need for a clamping base assigned to each workpiece and carrying it, as is reflected in the generic state of the art.

In addition, the special machining position of the workpiece permits significant reduction of tool-related expense, in that the production machines generally require a working area with only a single arbor.

Application of the process claimed for the invention is made possible by the fact that the workpieces are outfitted with a special adjusting element allowing precisely definable workpiece positioning for a particular operation.

Instead of the adjusting surfaces on the side surfaces of workpieces known in the state of the art being provided with a stopping face on one end surface, a certain number of adjusting holes with flanged surfaces are now made on one end of the workpiece. Each adjusting hole is designed as a stepped hole, with an outer base hole larger in cross section having already been made by the supplier of the castings. First an internal locating hole smaller in diameter is premachined and is then finish machined to the fitting tolerance (for example, with a diameter one millimeter smaller than that of the base hole), with allowance made for changes in the workpiece resulting from stresses in the unmachined part. During casting of the unmachined part, the flanged surface associated with each adjusting hole is made about 0.5 mm deeper than the finished size of the end surfaces, so that precise positioning adjustment can be accomplished even after finish machining is completed.

The process of the invention, combined with the special workpiece adjustment arrangement, also facilitates design of the clamping devices required at the individual machining stations.

Other objects and advantages of the present invention will become more apparent to those persons having ordinary skill in the art to which the present invention pertains from the following description taken in conjunction with the accompanying drawings.

DETAILED DESCRIPTION

Figure 1:
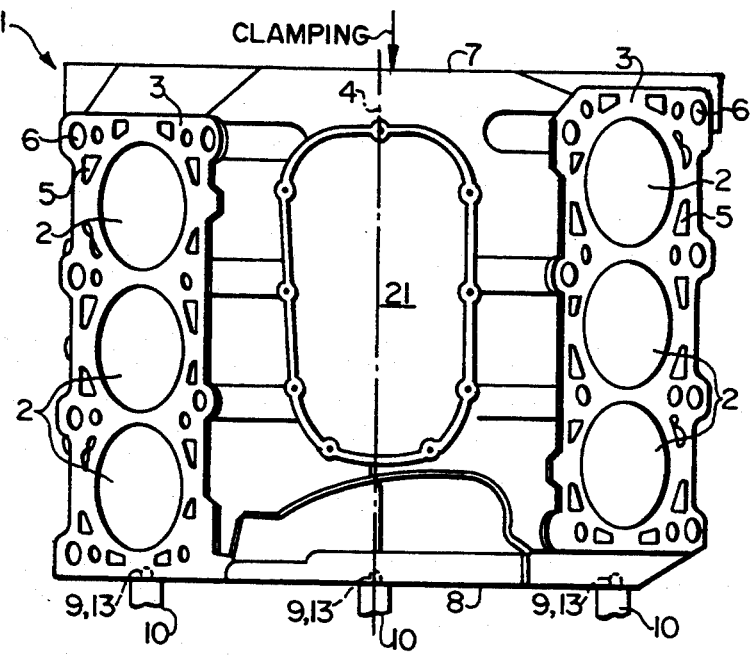
FIG. 1 shows a cylinder block of an internal combustion engine in machining position I, in which it rests on one of its end surfaces.

A cylinder block 1 of a six-cylinder v engine such as is shown in FIG. 1 in the finish machined state has a suitable number of cylindrical holes 2 ending on flat lands 3 on which a cylinder head is later positioned and fastened. The lateral surfaces 3, 11, 12, 18, 21 of the cylinder block 1 that are machinable in this machining position always extend more or less parallel to the longitudinal axis 4 of the block. The lands 3 and the other lateral surfaces 11, 12, 18, 21 have a number of channels 5 and tapped holes 6, as well as other holes and the like for coolant flow, lubricant circulation, and for mounting of the cylinder head and other add-on parts. Extending at approximately right angles to the longitudinal axis 4 of the cylinder block are upper and lower frontal areas 7, 8 in which an additional number of miscellaneous holes, tapped holes, etcetera are to be made for specific purposes in the course of the production process.

The lower frontal area 8 of the cylinder block 1 rests in the area of adjusting holes 9, with the countersunk areas 14 applied there (see FIG. 3), on three supports 10 at each of production stations 54–88 and is clamped from above by means of suitable devices. A locating pin 3 mounted on each support 10 engages the appropriate adjusting hole 9, so that the cylinder block 1 is immobilized precisely in the position required. The diameter of the fiat surfaces of the supports 10, which preferably are cylindrical in shape, fits countersunk areas 14 on the frontal surface 8.

Figure 3:
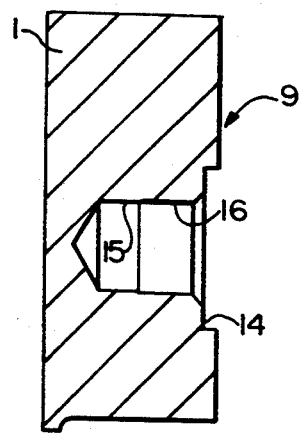
FIG. 3 shows an individual view of one of the adjusting holes to be seen in FIG. 3.

As is also to be seen from FIG. 3, the adjusting hole 9 is made with two steps; a base hole 16 larger in diameter receives suitably dimensioned positioning pins 28 mounted on the workpiece conveyor system 27 that carries the cylinder block 1 from one production station to another, while an inner, deeper locating hole 15 receives the locating pin 13 directly at the production station 50-88. The related process is explained below in connection with FIGS. 4 to 6.

Figure 2:
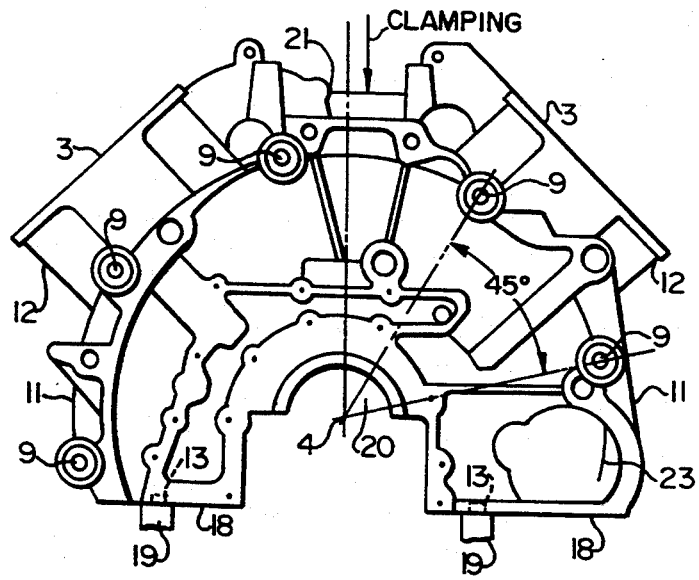
FIG. 2 shows the cylinder block in its machining position II, in which it rests on one of its lateral surfaces (oil pan side)

As is to be seen from FIG. 2, a total of five adjusting holes 9 are provided in the embodiment illustrated. These holes are made relative to the longitudinal axis 4 of the cylinder block in a 45° grid on the outer circumference of the lower frontal surface 8.

Figure 5:
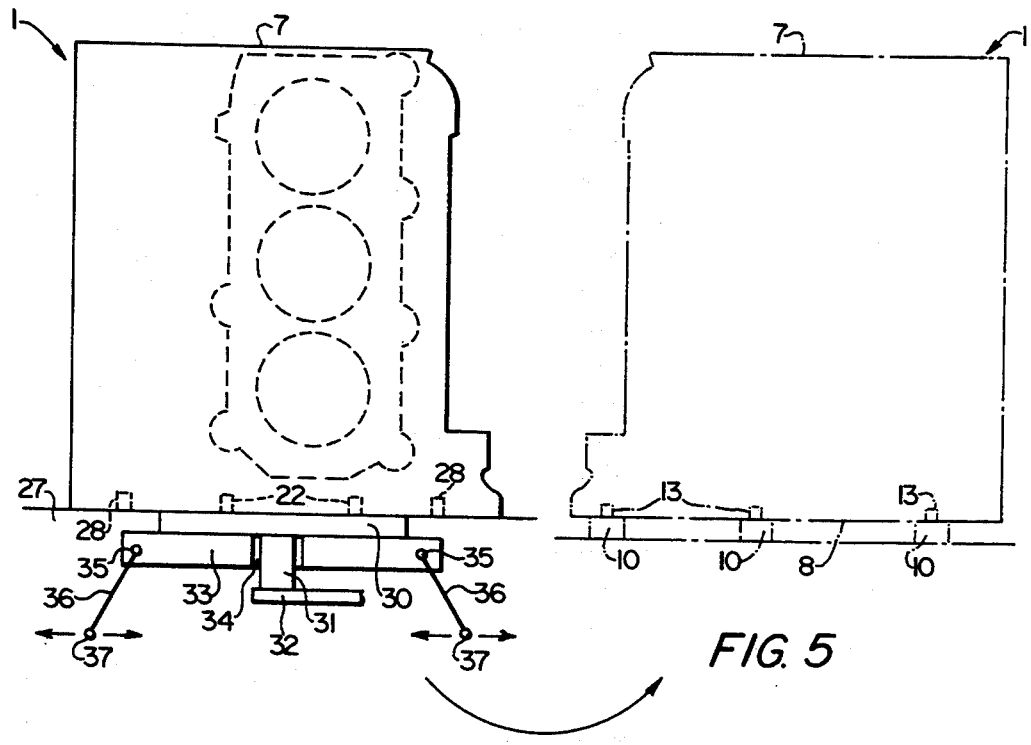
FIG. 5 shows a diagram of a workpiece transfer and slewing device.
Figure 6:
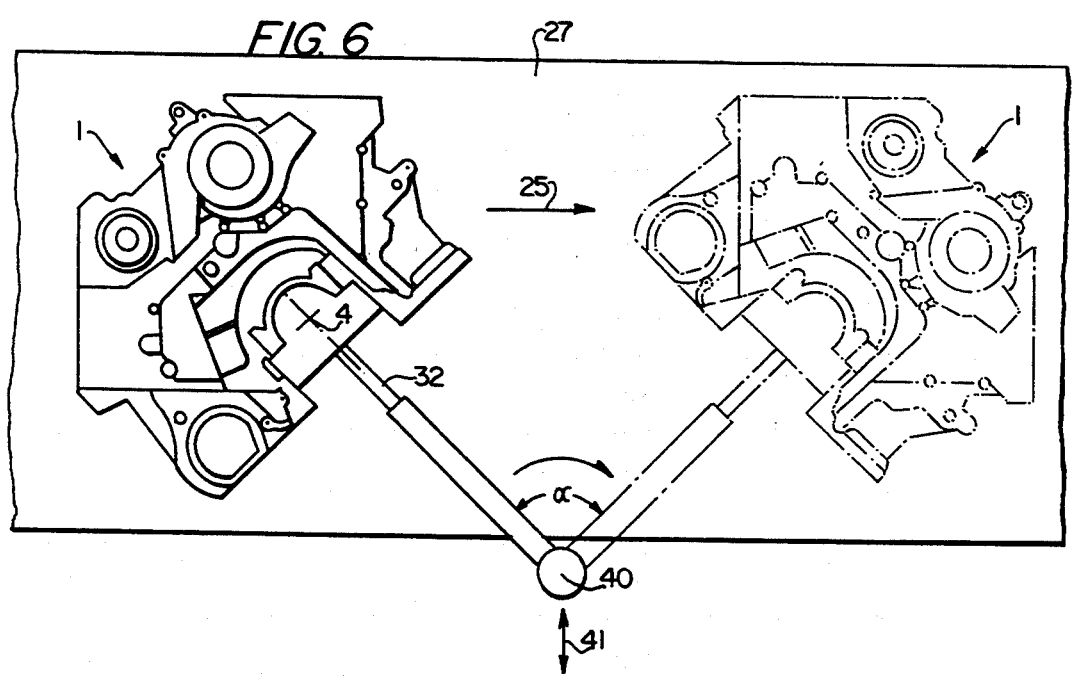
FIG. 6 shows a top view of the illustration in FIG. 5.

Any other relative grid pattern, such as of 30° or 60°, is also conceivable in place of the cylinder block slewing angles corresponding to the 45° grid pattern; it would also be possible to provide another grid pattern adjacent to the adjacent adjusting hole 9. Any other desired number of adjusting holes would be possible. All this depends on the basic design of the cylinder block and the angular correlation of the surfaces applied that are to be machined, the holes to be drilled, and so forth. The associated process of slewing of the cylinder block about its longitudinal axis 4 is shown in FIGS. 5 and 6.

In FIG. 2, which shows the cylinder block 1 in its machining position II for machining of the two frontal areas 7, 8 and, among other things, a (semicircular) crankshaft bore 20 and a receiving hole 23 for the starter of the internal combustion engine, the already machined flat surface 18 of the cylinder block 1 on the oil pan side rests on additional supports 19, which may also be provided with the locating pins 13 known from FIG. 1, again in order to operate in conjunction with appropriate adjusting holes.

It is preferable for the adjusting holes 9 to be made during casting, in the unmachined ingot. For this purpose the ingot is aligned in its x, y, and z planes and relative to the V angle of the cylinder bores so that the adjusting holes 9 with countersunk areas 14 for the supports 10 may be made in their assigned positions. The recesses for the crankshaft hole and the cylinder bores are suitable profiles of the unmachined ingot for such alignment.

Tools are positioned by a state-of-the-art method, as for example mechanically or hydraulically, in keeping with the machining mode (boring, milling, etc) and as a function of the component section of the workpiece to be machined. Advance of the tool for the machining process may be numerically controlled. On the basis of the alignment and slewability of the workpiece claimed for the invention, it is possible, for example, to machine all parts families of in-line and V engines, etcetera, on a production line without bypass lines and for the most part in the normal arrangement (no oblique positioning), with a single-axis operating area in tool engagement and advance.

Figure 4:
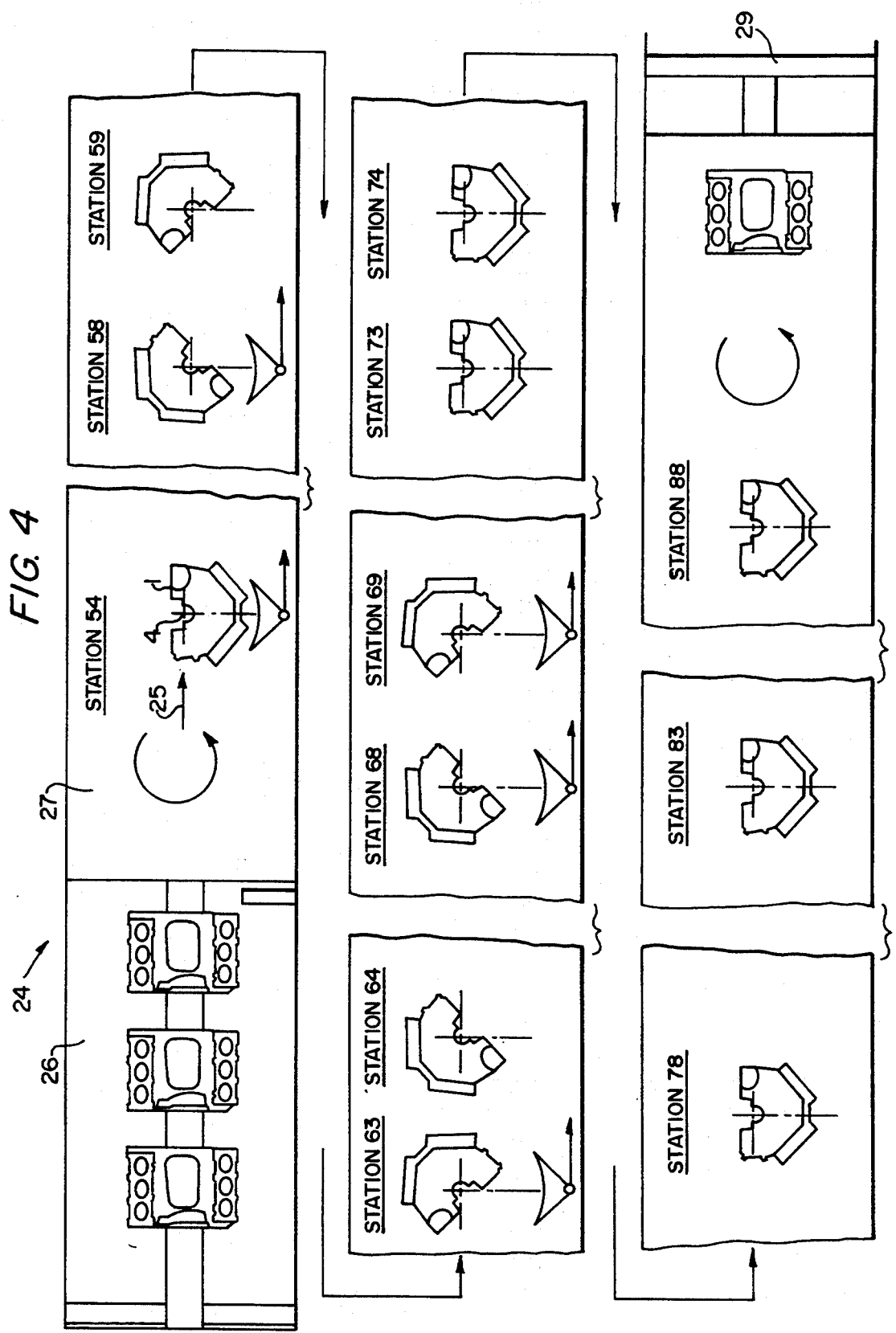
FIG. 4 shows a transfer line with individual production stations.

FIG. 4 shows a section of a production line 24 for machining of lateral surfaces extending essentially parallel to the longitudinal axis 4 of the cylinder block 1; the holes, tapped holes, and so forth are also made in these surfaces here. The individual machining units, as viewed in the direction of workpiece conveyance 25, are on the left or right side of the production line 24 and are aligned so as to be transverse to the direction of workpiece conveyance 25. For the most part horizontal units are required, and in exceptional cases vertical units.

The cylinder blocks 1 are taken from a buffer supply unit 26 by a state-of-the-art process, at an assigned fixed distance from each other, and reach the workpiece conveyor system 27 proper. Immediately after leaving the buffer supply unit 26, a cylinder block 1, which initially rests on the initially unmachined flat surface on the oil pan side, is taken by way of a suitable device not shown here to machining position I; two positioning pins 28 provided on the workpiece conveyor system 27 (see FIG. 5) engage the base holes 16 of the adjusting holes 9 on the cylinder block side and thus hold the cylinder block 1 in an assigned position and to this extent also perform a certain amount of preliminary adjustment.

The machining steps at the individual stations shown in FIG. 4 are the following:

Station 54
  rough milling of the flat surface 18 on the oil pan side,
Stations 58 and 59
  rough milling of lands 3,
Stations 63 and 64
  premachining of the cylindrical holes 2,
Stations 68 and 69
  other stations (reserve stations) for premachining of cylindrical bores
Stations 73 and 74
  milling of beating lands and surfaces on the oil pan side, station 74 serving as reserve station,
Station 78
  drilling of semicircular crankshaft hole 20,
Station 83
  finish milling of flat surface 18 on the oil pan side, and
Station 88
  drilling of holes on the oil pan side.

It is to be understood that other machining processes are carried out at other intermediate stations.

After station 88, with more than 90% of aggregate machining processes already completed, the cylinder block 1 is rotated by a method not shown here and moved into machining position II illustrated in FIG. 2, in which position flat surface 18 on the oil pan side, which has now been machined, now serves as reference surface. While in this position the cylinder block 1 reaches an intermediate buffer unit 29 before being taken to another section of the production line, in which the two frontal areas 7, 8 are machined.

This section of the production line 24 is, of course, relatively short, in that, as stated earlier, the great majority of the machining processes are carried out at stations 54 to 88.

FIGS. 5 and 6 present two views and a diagram of an embodiment of a device for transfer and simultaneous slewing of the cylinder block 1 in the area of a production station. A bearing table 30 with two positioning pins 22 is provided for this purpose. The bearing table also has a concentrically positioned pivot 31 projecting downward, a swivel arm 32 being coupled nonrotatably to this pivot. The beating table 30 rests on a base frame 33, the pivot 31 in question extending through a hole 34 in the base frame 33. On its end the latter is coupled at articulation points 35 to links 36 the other ends of which 37 are movable in the direction of the arrow, for example, by means of suitable hydraulic elements. This makes it possible to raise the base frame 33, and with it the bearing table 30 carrying the cylinder block 1, a more or less short distance above the plane of the workpiece conveyor system 27 or to lower it. This also makes it possible alternately to engage the adjusting holes 9 or their base holes 16 with the positioning pins 28 on the conveyor system side referenced above and the positioning pins 22 on the beating table side and to disengage these holes.

The swivel arm 32 is designed to telescope and is mounted on bearing table 30 and is mounted on a pivot pin 40 on the side, on the workpiece conveyor system 27. As is indicated by the double arrow 41, the pivot pin 40 is movable (preferably by means of suitable hydraulic positioning elements) transversely to the direction of workpiece conveyance 25. As a result, when the cylinder block 1 is transferred from its position indicated by the heavy solid line into the position indicated by the light solid line, the swivel arm 32 sweeps a pivot angle $\alpha$ of varying value. The latter corresponds to the angle through which the cylinder block 1 finally rotates about its longitudinal axis 4. In the illustration in FIG. 6, it is 90°.

Before the pivoting movement is initiated, the bearing table 30 is first raised by the means indicated in order to disengage the base holes 16 from the positioning pins 28 on the conveyor system side.

At the same time, positioning pins 22 on the bearing table side engage other base holes, so that the cylinder block 1 is immobilized during the slewing movement. When the slewing process ends, the bearing table 30 is lowered again, so that the locating pins 13 on the supports 10 of the production station may engage the locating holes 15 to the extent that contact between the positioning pins 22 of the bearing table 30 and the base holes 16 are broken by the downward movement of the bearing table 30.

When the cylinder block 1 has reached this machining position, it may be clamped.

Hence the cylinder block 1 is immobilized during the entire production process, so that tool carriers that are directly assigned to it and carry it, and at the same time clamp it, are rendered superfluous.

It goes without saying that the invention may also be applied in the production of other parts of vechicle drive assemblies, as for example cylinder heads, transmissions, and so forth.

We claim:

1. A process for the production of a workpiece of a motor vehicle drive assembly on a transfer production line including a conveyor system, the workpiece including a longitudinal axis, at least one lateral surface substantially parallel to the longitudinal axis, and at least one end face positioned substantially perpendicular to the at least one lateral surface, the process comprising:
- resting the workpiece on the at least one end face on the conveyor system with the longitudinal axis substantially vertical,
- moving the workpiece to at least one individual production stage,
- swivelling the workpiece about the longitudinal axis to a specific machining position,
- clamping the workpiece in the position,
- machining the at least one lateral surface.

2. The process according to claim 1, wherein the at least one individual production stage includes a second production stage for machining the at least one end face, the process further comprising after the step of machining the at least one lateral surface the following steps:
- moving the workpiece to the second production stage,
- positioning the workpiece at the second production stage in a second machining position resting on the at least one lateral surface with the longitudinal axis substantially horizontal,
- clamping the workpiece in the second position,
- machining the at least one end face.

* * * * *